Sept. 21, 1926.

H. A. STEWART

BALL GRINDING MACHINE

Filed Oct. 16, 1925     3 Sheets-Sheet 1

1,600,910

H.A.Stewart
INVENTOR

BY *Victor J. Evans*
ATTORNEY

WITNESS:

Sept. 21, 1926.  H. A. STEWART  1,600,910
BALL GRINDING MACHINE
Filed Oct. 16, 1925   3 Sheets-Sheet 2
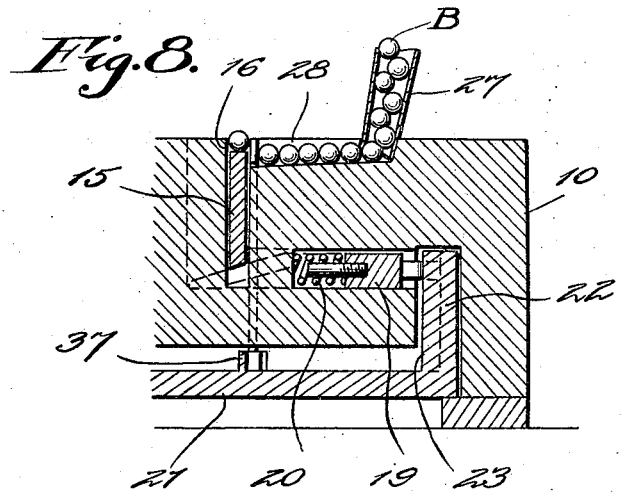
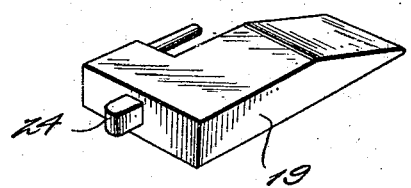
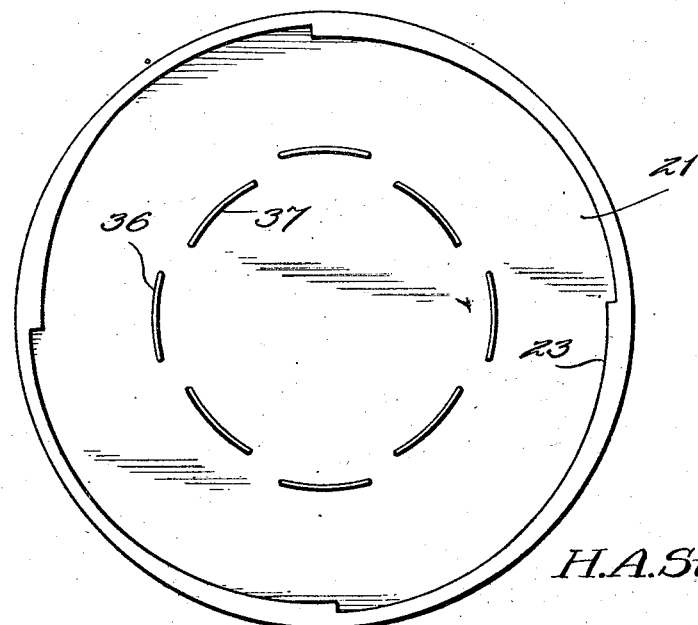
H. A. Stewart
INVENTOR
BY Victor J. Evans
ATTORNEY
WITNESS:

Sept. 21, 1926.   H. A. STEWART   1,600,910
BALL GRINDING MACHINE
Filed Oct. 16, 1925   3 Sheets-Sheet 3

H. A. Stewart
INVENTOR

BY Victor J. Evans
ATTORNEY

WITNESS:

Patented Sept. 21, 1926.

1,600,910

UNITED STATES PATENT OFFICE.

HENRY ARTHUR STEWART, OF HIGHLAND PARK, MICHIGAN.

BALL-GRINDING MACHINE.

Application filed October 16, 1925. Serial No. 62,865.

This invention relates to machines for grinding balls of the type used in anti-friction bearings.

An object of the present invention is the provision of means for controlling the grinding operation, so that the machine may be set and the balls accurately ground.

To this end, the invention provides a machine for automatically controlling the feed of the balls to the machine and the discharge of said balls therefrom, together with means for automatically controlling the grinding operation, so that the operation of the machine will be entirely automatic with a result that production will be increased and the cost of manufacture lessened.

Another object of the invention is the provision of a machine in which the feeding, grinding and discharging of the balls will be automatically controlled by a single operating member and thus produce a machine which is simple in construction, reliable in operation and capable of being built in compact form.

With the above and other objects in view, the invention further includes the following novel features and details of construction, to be hereinafter more fully described, illustrated in the accompanying drawings and pointed out in the appended claims.

In the drawings:—

Figure 8 is an enlarged fragmentary sectional view through the feed chute.

Figure 9 is a detail plan view of the cam disk.

Figure 10 is a detaial perspective view of one of the sliding wedges.

Figure 1:
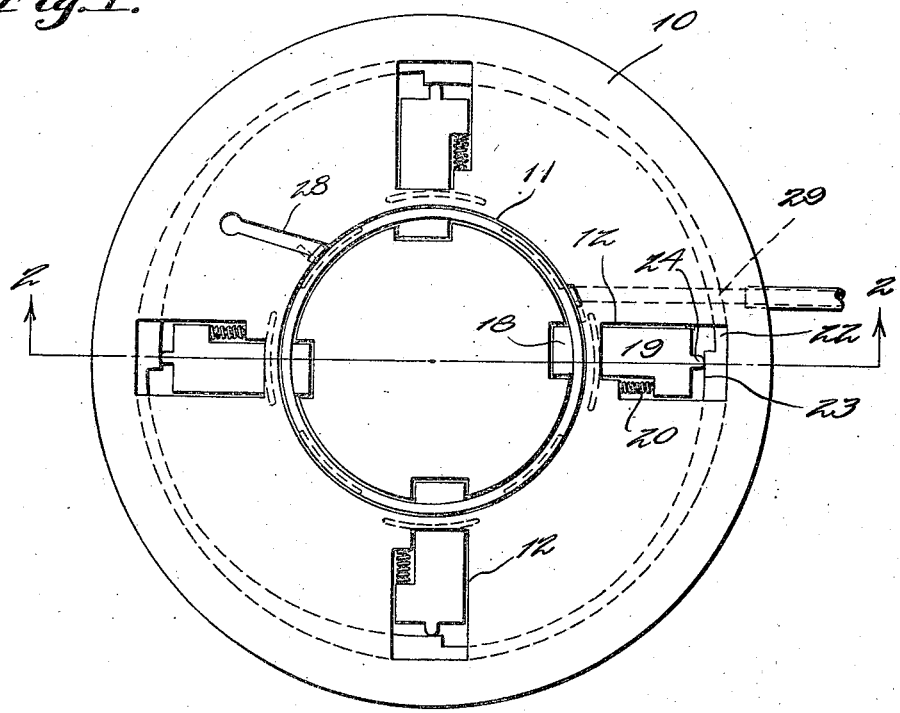
Figure 1 is a plan view of a machine constructed in accordance with the invention.
Figure 2:
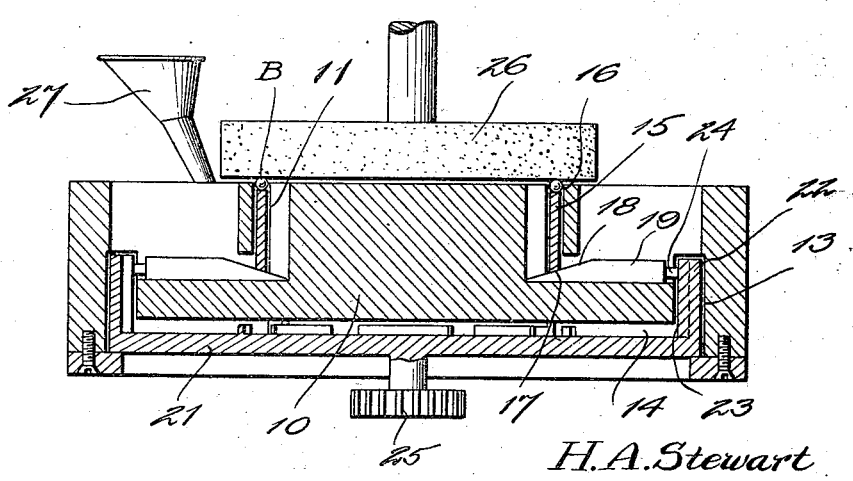
Figure 2 is a section taken substantially on the line 2—2 of Figure 1 showing the grinding wheel in elevation.

Referring to the drawings in detail wherein like characters of reference denote corresponding parts, the reference character 10 indicates the body of the machine which is provided with a concentrically arranged annular groove 11 having spaced radially disposed chambers 12 communicating therewith. The outer ends of the chambers 12 communicate with a concentrically arranged annular groove 13 and this groove is in communication with a recess 14 located in the bottom of the body 10.

Located within the groove 11 is an annular 15 which provides a bottom for a ball race or groove 16, the annular 15 being adjustable so as to regulate the depth of the race or groove 16. The inner edge of the annular 15 is preferably beveled as shown at 17 and this beveled edge is adapted to rest upon beveled faces 18 provided upon wedges 19 located and slidable in the chambers 12. The wedges 19 are yieldingly forced outward by springs 20.

Rotatably mounted within the recess 14 is a cam disk 21 which is provided with an annular flange 22 which operates within the groove 13. The flange 22 is provided with spaced cam ribs 23 which, when the disk 21 is rotated will engage lugs 24 extending from the outer ends of the wedges 19 so as to force the latter inward. This inward movement of the wedges will cause the annulus 15 to move upward within the groove 11 so as to reduce the depth of the ball race or groove 16. A gear or other operating member 25 may be associated with the disk 21 so that the latter may be rotated by suitable power.

Mounted for rotation above the groove 16 and supported and operated by any suitable means is a grinding wheel 26 which is designed to be engaged by balls B positioned within the groove 16, so that the balls will be ground, as will be readily understood.

The balls are fed to the groove 16 from a hopper 27, the latter communicating with a feed chute 28 whose inner end communicates with the groove 16. The balls are discharged from the groove 16 through a chute 29.

The chutes 28 and 29 are controlled by gates 30 and 31 respectively, the said gates being mounted upon rods 32 and 33 respectively which are mounted for rotation in bearings 34 provided in the body 10. The lower ends of the gates 30 and 31 are provided with right angular wings or lugs 35.

The cam disk 21 in addition to controlling the annulus 15 through the wedges 19, also controls the operation of the gates 30 and 31 and for this purpose the said disk is provided with spaced staggered ribs 36 and 37 which rise from the upper face of the disk and are designed to engage the wings 35.

Figure 3:
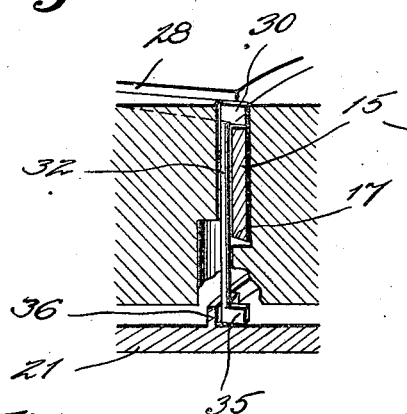
Figure 3 is a fragmentary sectional view partly in perspective illustrating the gate of the feed chute in open position.
Figure 4:
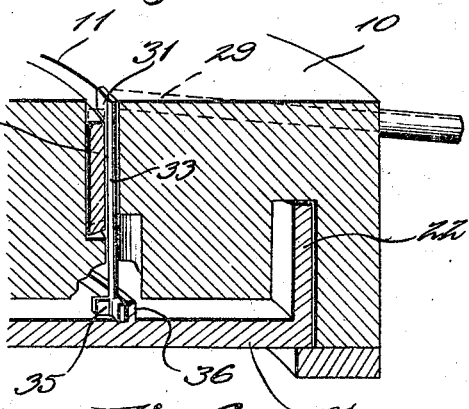
Figure 4 is a like view showing the gate of the discharge chute in closed position.
Figure 5:
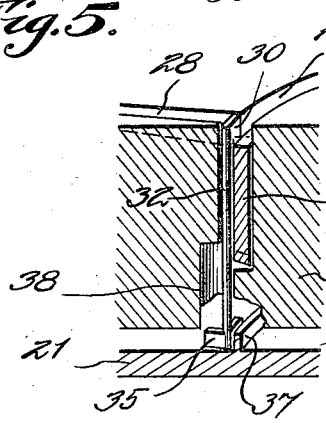
Figure 5 is a view similar to Figure 3 with the gate closed.

With the gate 30 in open position as illustrated in Figure 3 of the drawings, the balls will enter the ball race or groove 16. Rotation of the disk 21 by any suitable means will cause the cam ribs 23 to engage the lugs 24 of the wedges 19, whereupon the latter will be forced inward so as to raise the annulus 15. This upward movement of the annulus will bring the balls into contact with the grinding wheel 26, the position of the latter having first been adjusted in accordance with the diameter of the balls. Rotation of the wheel 26 will grind the balls as will be readily understood.

Figure 6:
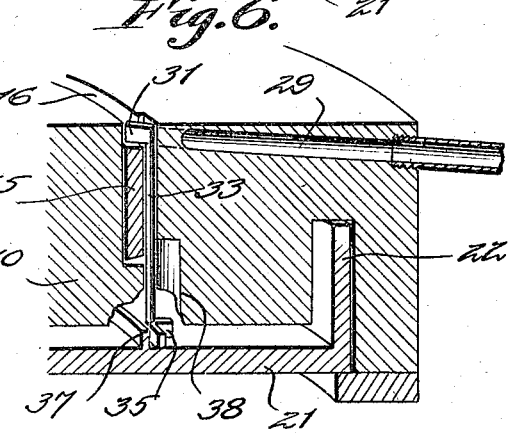
Figure 6 is a view similar to Figure 4 with the gate open.
Figure 7:
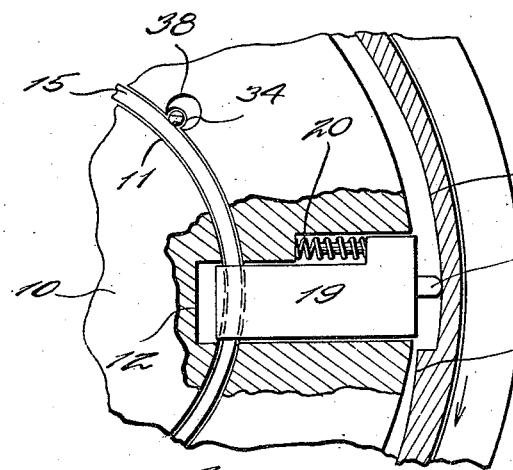
Figure 7 is a fragmentary bottom plan view partly in section with the cam disk removed.

As the disk 21 revolves, the rib 36 which has engaged one of the wings 35 to open the gate 30, will be disengaged from the said wing and one of the ribs 37 will engage the other wing 35 of the gate 30 and close the gate. After the gate 30 has been closed, one of the ribs 36 will engage one of the wings 31 and open the latter as shown in Figure 6 of the drawings to permit the balls to pass through the discharge chute 29, after which the other wing of the gate 30 will engage one of the ribs 37 to close the gate.

The speed of rotation of the disk 21 is considerably less than that of the wheel 26, so that the interval of time between the operation of the gate 30 and the gate 31 will be sufficient to properly grind the balls.

The position of the wheel 26 is adjusted in accordance with the size of the balls to be ground and in accordance with the wear upon the wheel 26 so that the balls will be automatically fed to the machine, automatically ground and thereafter automatically discharged.

The body 10 is provided with recesses 38 to provide for the introduction of the gates 30 and 31 when the machine is being assembled.

The invention is susceptible of various changes in its form, proportions and minor details of construction and the right is herein reserved to make such changes as properly fall within the scope of the appended claims.

Having described the invention what is claimed is:—

1. A ball grinding machine comprising a body having an annular ball receiving groove therein, a movable bottom for the groove, an abrasive element mounted above the groove, means to automatically feed the balls into the groove, radially slidable means to automatically move the bottom of the groove to bring the balls into contact with the abrasive element and means to automatically discharge the balls from the groove.

2. A ball grinding machine comprising a body having an annular ball receiving groove therein, an abrasive element mounted above the groove, means including a horizontally rotatable member to automatically move the balls into contact with the abrasive element and means to automatically discharge the balls from the groove.

3. A ball grinding machine comprising a body having an annular ball receiving groove therein, a movable bottom for the groove, an abrasive element mounted above the groove, means to feed the balls into the groove, means to regulate the depth of the groove to bring the balls into contact with the abrasive element, means to discharge the balls from the groove and means common to the feeding means, groove depth regulating means and discharging means for controlling the same.

4. A ball grinding machine comprising a body having an annular ball receiving groove therein, a movable bottom for the groove, an abrasive element mounted above the groove, means to feed the balls into the groove, means to regulate the depth of the groove to bring the balls into contact with the abrasive element, means to discharge the balls from the groove and means common to the feeding means, groove depth regulating means and discharging means for automatically controlling the same.

5. A ball grinding machine comprising a body having an annular ball receiving groove therein, an abrasive element mounted above the groove, an annulus within the groove, means to move the annulus to bring the balls into engagement with the abrasive element, means to feed the balls to the groove and means to control the discharge of the balls from the groove.

6. A ball grinding machine comprising a body having an annular ball receiving groove therein, an abrasive element mounted above the groove, an annulus within the groove, a feed chute for supplying balls to the groove, a discharge chute and rotatable means to control the feed and discharge chutes and move the balls into contact with the abrasive element.

7. A ball grinding machine comprising a body having an annular ball receiving groove therein, an abrasive element mounted above the groove, an annulus within the groove, a feed chute for supplying balls to the groove, a discharge chute, gates for the feed and discharge chutes and means to automatically control the gates and move the balls into contact with the abrasive element.

8. A ball grinding machine comprising a body having an annular ball receiving groove therein, an abrasive element mounted above the groove, an annulus within the groove, radially movable wedges to engage the annulus, means to operate the wedges and move the annulus to cause the balls to engage the abrasive element, means to feed the balls to the groove and means to control the discharge of said balls from the groove.

9. A ball grinding machine comprising a body having an annular ball receiving groove therein, an abrasive element mounted above the groove, an annulus within the groove, radially movable wedges to engage the annulus, a cam member engaging the wedges to actuate the latter and move the annulus to cause the balls to engage the abrasive element, gate controlled means to feed the balls to and discharge said balls from the groove and means common to the gates and cam member to operate the same.

10. A ball grinding machine comprising a body having an annular ball receiving groove therein, an abrasive element mounted above the groove, an annulus within the groove, gates for controlling the entrance of balls into and the discharge of balls from the groove, means engaging the gates to operate the latter, wedges engaging the annulus to control the latter and move the balls into and out of engagement with the abrasive element, a rotatable disk to control the gate and annulus engaging means and means to rotate the disk.

In testimony whereof I affix my signature.

HENRY ARTHUR STEWART.